United States Patent [19]

Ogawa et al.

[11] Patent Number: 5,932,654
[45] Date of Patent: Aug. 3, 1999

[54] PRIMER COMPOSITION FOR POLYOLEFINS

[75] Inventors: Takeshi Ogawa; Katsuo Miyazaki, both of Wako; Makoto Hashimoto, Hirakata, all of Japan

[73] Assignees: Honda Giken Kogyo Kabushiki Kaisha; Nippon Bee Chemical Co., Ltd., both of Japan

[21] Appl. No.: 08/971,230

[22] Filed: Nov. 15, 1997

[30] Foreign Application Priority Data

Nov. 28, 1996 [JP] Japan ................................. 8-317790

[51] Int. Cl.$^6$ ...................................................... C08G 63/91
[52] U.S. Cl. ............................................. 525/71; 524/504
[58] Field of Search ................................. 525/71; 524/504

[56] References Cited

U.S. PATENT DOCUMENTS 4,303,697 12/1981 Baseden .................................. 427/54.1

FOREIGN PATENT DOCUMENTS

| | | |
|---|---|---|
| 0238327 | 9/1987 | European Pat. Off. . |
| 60-038436 | 2/1985 | Japan . |
| 61-095076 | 5/1986 | Japan . |
| 7-150107 | 6/1995 | Japan . |
| 2225332 | 5/1990 | United Kingdom . |

*Primary Examiner*—Melvyn I. Marquis
*Assistant Examiner*—D. Aylward

[57] ABSTRACT

The present invention provides a primer composition for polyolefins which has sufficient adhesion to polyolefin base materials and excellent resistance to gasohol and high pressure washing of cars. This primer composition for polyolefins comprises: acid anhydride-modified polypropylene chloride (A), which includes polypropylene chloride moiety (a1) and acid anhydride moiety (a2) as bonded thereto, and has a chlorine content of 19.5 to 20.5 wt %, an acid anhydride moiety content of 0.8 to 1.2 wt %, and a weight-average molecular weight of 30,000 to 36,000; and acryl-modified polypropylene chloride (B), which includes polypropylene chloride moiety (b1) and acrylic polymer chain moiety (b2) as grafted thereon, and has a weight-average molecular weight of 30,000 to 200,000, wherein: polypropylene chloride moiety (b1) has a chlorine content of 20 to 30 wt %; acrylic polymer chain moiety (b2) has a glass transition temperature of 60° C. or higher; and the ratio by weight between moieties (b1) and (b2) is b1/b2 =5/95 to 50/50; wherein the ratio by weight between acid anhydride-modified polypropylene chloride (A) and acryl-modified polypropylene chloride (B) is A/B=90/10 to 20/80.

1 Claim, No Drawings

PRIMER COMPOSITION FOR POLYOLEFINS

BACKGROUND OF THE INVENTION

A. TECHNICAL FIELD

The present invention relates to an improvement of a primer composition for polyolefins.

B. BACKGROUND ART

Polyolefins such as polypropylene are relatively inexpensive and have excellent properties such as moldability and chemical resistance, so polyolefins are widely used in industrial fields including the automotive industry. Polyolefins are, for example, used as exterior parts for automobiles such as bumpers and molds, and surfaces thereof are usually coated to improve weather resistance as well as to afford effects of design.

Even if directly coated to polyolefin base materials, conventional paints are difficult to adhere to the polyolefin base materials. Thus, the adhesion to the base materials needs to be ensured by precoating primers to the base materials, and various primers are proposed. When the primers are used, surfaces of the polyolefin base materials are usually pre-washed with trichloroethane vapor. By this pre-washing, the surfaces of the polyolefin base materials are degreased, and partially dissolved into trichloroethane and thereby etched. In recent years, trichloroethane is cited as one of substances causing ozone layer destruction, and banned from being used. Instead, water base washing such as alkali washing, acid washing, or warm water washing is carried out. However, the water base washing has problems in that: the surfaces of the polyolefin base materials are degreased, but not etched, and therefore, even if primers are coated, the adhesion cannot sufficiently be ensured, and furthermore, the solvent resistance, especially, the gasohol resistance, of coating films is deteriorated, and the coating films peel off from parting portions thereof when high pressure washing of cars is carried out.

In order to solve these problems, polyolefin base materials to which polar substances such as low molecular polyesters or polyethers are added are used to improve the adhesion. However, the rise in the price of the base materials due to the addition of the polar substances is unavoidable.

Thus, it is hoped that a primer, which has sufficient adhesion to polyolefin base materials and excellent resistance to gasohol and high pressure washing of cars, will be developed.

SUMMARY OF THE INVENTION

A. OBJECT OF THE INVENTION

An object of the present invention is to provide a primer composition for polyolefins, which has sufficient adhesion to polyolefin base materials and excellent resistance to gasohol and high pressure washing of cars.

B. DISCLOSURE OF THE INVENTION

The present inventors made various experiments to solve the above-mentioned problems. As a result, they attained the present invention by finding that a polypropylene chloride with a specific structure improves the gasohol resistance, and that an acryl-modified polypropylene chloride with a high glass transition temperature is excellent in the resistance to high pressure washing of cars.

That is to say, a primer composition for polyolefins, according to the present invention, comprises:

acid anhydride-modified polypropylene chloride (A), which includes polypropylene chloride moiety (a1) and acid anhydride moiety (a2) as bonded thereto, and has a chlorine content of 19.5 to 20.5 wt %, an acid anhydride moiety content of 0.8 to 1.2 wt %, and a weight-average molecular weight of 30,000 to 36,000; and acryl-modified polypropylene chloride (B), which includes polypropylene chloride moiety (b1) and acrylic polymer chain moiety (b2) as grafted thereon, and has a weight-average molecular weight of 30,000 to 200,000, wherein: polypropylene chloride moiety (b1) has a chlorine content of 20 to 30 wt %; acrylic polymer chain moiety (b2) has a glass transition temperature of 60° C. or higher; and the ratio by weight between moieties (b1) and (b2) is b1/b2=5/95 to B 50/50;

wherein the ratio by weight between acid anhydride-modified polypropylene chloride (A) and acryl-modified polypropylene chloride (B) is A/B=90/10 to 20/80.

These and other objects and the advantages of the present invention will be more fully apparent from the following detailed disclosure.

DETAILED DESCRIPTION OF THE INVENTION

The primer composition for polyolefins, according to the present invention, comprises acid anhydride-modified polypropylene chloride (A) and acryl-modified polypropylene chloride (B). Hereinafter, a detailed explanation is made about each component of this primer composition.

Acid Anhydride-Modified Polypropylene Chloride (A):

Acid anhydride-modified polypropylene chloride (A), as used in the present invention, is a polypropylene derivative comprising polypropylene chloride moiety (a1) and acid anhydride moiety (a2) as bonded to moiety (a1). Acid anhydride-modified polypropylene chloride (A) has a chlorine content of 19.5 to 20.5 wt %, an acid anhydride moiety content of 0.8 to 1.2 wt %, and a weight-average molecular weight of 30,000 to 36,000.

Polypropylene chloride moiety (a1) is a moiety comprising a polypropylene including a substituent chlorine atom. In addition, acid anhydride moiety (a2), for example, comprises a group as derived from an acid anhydride such as maleic anhydride or itaconic anhydride, and is a modified moiety as obtained by graft. Acid anhydride moiety (a2) may be a moiety comprising a group as derived either from only one acid anhydride or from two or more acid anhydrides.

Because acid anhydride-modified polypropylene chloride (A) has an acid anhydride moiety content of 0.8 to 1.2 wt % and a relatively low chlorine content of 19.5 to 20.5 wt %, it improves the gasohol resistance. In addition, conventionally, such a low chlorine content enhances the crystallinity and deteriorates the storage stability in the primer composition, but acid anhydride-modified polypropylene chloride (A) is set to have a weight-average molecular weight of 30,000 to 36,000 that is lower than a conventional one, so acid anhydride-modified polypropylene chloride (A) does not crystallize, and the storage stability of the primer composition is therefore sufficiently ensured.

Acid anhydride-modified polypropylene chloride (A) is a polypropylene as internally modified by reacting a polypropylene with an acid anhydride and chlorine, and is, for example, produced by reacting chlorine and an acid anhydride upon a polypropylene, wherein either of the chlorine and the acid anhydride may be reacted earlier upon the polypropylene. The reaction with chlorine is, for example, carried out by introducing a chlorine gas into a solution including a polypropylene. In addition, the reaction with an acid anhydride is, for example, carried out by reacting the acid anhydride upon a polypropylene (or polypropylene chloride) in the presence of a peroxide.

Acid anhydride-modified polypropylene chloride (A) is not especially limited if it has a chlorine content of 19.5 to 20.5 wt %. A chlorine content of less than 19.5 wt % crystallizes acid anhydride modified polypropylene chloride (A) and deteriorates the storage stability of the primer composition. On the other hand, a chlorine content of more than 20.5 wt % enhances the polarity of acid anhydride-modified polypropylene chloride (A) and deteriorates the gasohol resistance.

The acid anhydride moiety content of acid anhydride-modified polypropylene chloride (A) is not especially limited if it is in the range of 0.8 to 1.2 wt %. An acid anhydride moiety content of less than 0.8 wt % reduces thermal fusibility and therefore deteriorates the gasohol resistance. On the other hand, an acid anhydride moiety content of more than 1.2 wt % increases the number of acid anhydride groups and deteriorates the water resistance and the humidity resistance.

Acid anhydride-modified polypropylene, chloride (A) is not especially limited if it has a weight-average molecular weight of 30,000 to 36,000. A weight-average molecular weight of less than 30,000 deteriorates the strength of a primer coating film resultant from the primer composition and might cause cohesive failure of the primer coating film in an adhesion test. On the other hand, a weight-average molecular weight of more than 36,000 deteriorates the wettability to polyolefin base materials and deteriorates the gasohol resistance and the storage stability of the primer composition.

Acryl-Modified Polypropylene Chloride (B):

Acryl-Modified polypropylene chloride (B), as used in the present invention, is a polypropylene comprising polypropylene chloride moiety (b1) and acrylic polymer chain moiety (b2), wherein moiety (b2) is grafted on moiety (b1) and has a glass transition temperature of 60° C. or higher, and acryl-modified polypropylene chloride (B) has a weight-average molecular weight of 30,000 to 200,000. Because acryl-modified polypropylene chloride (B) includes acrylic polymer chain moiety (b2) of a glass transition temperature of 60° C. or higher and has the relatively large weight-average molecular weight, the resultant primer coating film has high elasticity and the resistance to high pressure washing of cars is therefore improved.

Polypropylene chloride moiety (b1) is a moiety forming the main framework of acryl-modified polypropylene chloride (B), and the chlorine content of moiety (b1) is not especially limited if it is in the range of 20 to 30 wt %. A chlorine content of less than 20 wt % deteriorates the storage stability of the primer composition. On the other hand, a chlorine content of more than 30 wt % deteriorates the adhesion to polyolefin base materials and therefore deteriorates the resistance to high pressure washing of cars.

Acrylic polymer chain moiety (b2) is a polymer chain as grafted on polypropylene chloride moiety (b1). The glass transition temperature of acrylic polymer chain moiety (b2) is not especially limited if it is in the range of 60° C. or higher. Where the glass transition temperature is lower than 60° C., the strength of a coating film as formed from the primer composition on surfaces of polyolefin base materials is low and the coating film peels off from the surfaces of the base materials due to high water pressure when the high pressure washing of cars is carried out. Acrylic polymer chain moiety (b2) comprises a structural unit, as derived from an acrylic monomer, as an essential component, but may be fitly a copolymer moiety further comprising a structural unit as derived from another monomer.

Examples of the acrylic monomer include acrylic ester monomers such as methyl acrylate, methyl methacrylate; butyl methacrylate, and 25 hydroxyethyl acrylate. The acrylic monomer may be used either alone or in combinations of two or more thereof.

Examples of another monomer include styrene monomers such as styrene, vinyl toluene, and α-methylstyrene. These other monomers may be used either alone or in combinations of two or more thereof.

The structural unit as derived either from the acrylic monomer or from another monomer is fitly selected such that the glass transition temperature of acrylic polymer chain moiety (b2) can be 60° C. or higher. Examples of acrylic polymer chain moiety (b2) satisfying such conditions of the glass transition temperature include such as comprises a major proportion of a structural unit as derived from methyl methacrylate and fitly a minor proportion of a structural unit as derived from styrene butyl methacrylate, or 2-hydroxyethyl acrylate.

Acryl-modified polypropylene chloride (B) is, for example, obtained by dissolving a polypropylene chloride with a chlorine content of 20 to 30 wt % into a solvent under heating and then graft-polymerizing the above-mentioned acrylic monomer or another monomer upon the polypropylene chloride in the presence of a peroxide.

The ratio by weight between moieties (b1) and (b2) in acryl-modified polypropylene chloride (B), b1/b2, is in the range of 5/95 to 50/50, preferably, 10/90 to 30/70. Where the ratio by weight, b1/b2, is less than 5/95, the adhesion to polyolefin base materials is deteriorated. Where the ratio by weight, b1/b2, is more than 50/50, the ratio by weight of moiety (b2) is low and the resistance to high pressure washing of cars is deteriorated.

Acryl-modified polypropylene chloride (B) is not especially limited if it has a weight-average molecular weight of 30,000 to 200,000. Where the weight-average molecular weight is less than 30,000, the strength of a coating film resultant from the primer composition is low and the coating film peels off from polyolefin base material surfaces due to high water pressure when the high pressure washing of cars is carried out. On the other hand, where the weight-average molecular weight is more than 200,000, the wettability to polyolefin base materials is deteriorated and the adhesion is therefore deteriorated, and further, the viscosity is so high that the coating workability is deteriorated.

Other Components:

The primer composition for polyolefins, according to the present invention, may fitly further comprise the following components: resins such as acrylic resins, alkyl resins, polyester resins melamine resins, epoxy resins, and blocked isocyanate resins; and organic solvents such as toluene, xylene, ethyl acetate, butyl acetate, methyl ethyl ketone, and methyl isobutyl ketone. Where the resin is added the amount thereof is in the range of 0 to 100 parts by weight relative to 100 parts by weight of the total of acid anhydride-modified polypropylene chloride (A) and acryl-modified polypropylene chloride (B).

In addition, the primer composition for polyolefins may further comprise the following pigments: inorganic pigments such as titanium white and carbon black; extenders such as talc and precipitated barium; and various organic coloring pigments.

Primer Composition for Polyolefins:

The primer composition for polyolefins, according to the present invention, comprises acid anhydride-modified polypropylene chloride (A) and acryl-modified polypropylene chloride (B) as essential components, as explained above in detail, and if need arises, the composition may further comprise the above-mentioned other components.

The ratio by weight between add anhydride-modified polypropylene chloride (A) and acryl-modified polypropylene chloride (B) in the primer composition for polyolefins, A/B, is in the range of 90/10 to 20/80, preferably, 70/30 to 40/60. Where the ratio by weight, A/B, is less than 20/80, the ratio of the combination of anhydride-modified polypropylene chloride (A) is low, and the gasohol resistance is deteriorated, and the peeling off tends to occur where gasoline or gasohol attaches. On the other hand, where the ratio by weight, A/B, is more than 90/10, the ratio of the combination of acryl-modified polypropylene chloride (B) is low and the resistance to high pressure washing of cars is deteriorated.

The primer composition for polyolefins, according to the present invention, is, for example, used to coat base materials, comprising polyolefin materials, such as car bumpers. A primer coating film is formed on polyolefin base material surfaces by coating the primer composition for polyolefins onto the polyolefin base material surfaces and then drying the coated primer composition. Even if the primer composition is coated onto polyolefin base material surfaces as not subjected to water base washing the adhesion and the resistance to gasohol and high pressure washing of cars are obtained anyway, but if the polyolefin base material surfaces are subjected to water base washing prior to coating, the adhesion and the resistance to gasohol and high pressure washing of cars are further improved.

The method for coating the primer composition for polyolefins onto polyolefin base materials is not especially limited, but spray coating is preferable. The method for drying the primer composition as coated to polyolefin base materials is not especially limited, either, and the drying is usually carried out under conditions of 80 to 120° C. for 5 to 30 minutes using hot air drying ovens or far or near infrared ovens. The thickness of the primer coating film as obtained in this way is not especially limited but it is preferably in the range of 5 to 15 $\mu$m. Where the thickness is less than 5 $\mu$m, it might be too thin to obtain a continuous uniform film.

The coating to polyolefin base materials is carried out by further coating an overcoating paint onto the primer coating film as formed on surfaces of the base materials. The overcoating paint is not especially limited, but examples thereof include one-liquid melamine baking paints, two-liquid urethane paints, one-liquid lacquer paints. (Effects and Advantages of the Invention):

The primer composition for polyolefins, according to the present invention, has sufficient adhesion to polyolefin base materials and excellent resistance to gasohol and high pressure washing of cars, and therefore is excellent especially for uses of coating the polyolefin base materials such as car bumpers.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples.

In addition, hereinafter, the units "part(s)" denotes "part (s) by weight."

EXAMPLE 1

Primer composition for polyolefins (1) was produced by mixing 12 parts of acid anhydride-modified polypropylene chloride (A1) of properties, as shown in Table 1, 12 parts of acryl-modified polypropylene chloride (B1), as shown in Table 2, 16 parts of pigment (Titanium. R-820, made by Ishihara Sangyo Kabushiki Kaisha), and 60 parts of toluene, wherein: acryl-modified polypropylene chloride (B1) comprises polypropylene chloride moiety (b1) and acrylic polymer chain moiety (b2), as cited in Table 2, and acrylic polymer chain moiety (b2) is a moiety comprising structural units as derived from monomers as cited in Table 2.

TABLE 1

| Acid anhydride-modified polypropylene chloride | A1 | A2 | A3 | A4 |
|---|---|---|---|---|
| Chlorine content (%) | 20 | 23 | 20 | 20 |
| Maleic anhydride moiety content (%) | 1 | 0.8 | 1 | 0.6 |
| Weight-average molecular weight | 33,000 | 35,000 | 45,000 | 30,000 |

TABLE 2

| Acryl-modified polypropylene chloride | | B1 | B2 | B3 | B4 | B5 |
|---|---|---|---|---|---|---|
| Polypropylene chloride moiety*[1] b1 | | 10 | 20 | 15 | 10 | —*[2] |
| Acrylic polymer chain moiety b2 | Methyl methacrylate | 50 | 30 | 25 | 50 | 30 |
| | Styrene | 10 | 20 | 30 | 20 | 20 |
| | Butyl methacrylate | 27 | 27 | 27 | — | 17 |
| | 2-Hydroxyethyl acrylate | 3 | 3 | 3 | 3 | 3 |
| | Butyl acrylate | — | — | — | 17 | 30 |
| Tg of acrylic polymer chain moiety (° C.) | | 69 | 65 | 72 | 54 | 21 |
| Weight-average molecular weight (unit: $10^4$) | | 12 | 12 | 12 | 12 | 12 |

The unit of b1 and b2 is part(s) by weight.
*[1]Chlorine content 26 wt %, weight-average molecular weight 70,000.
*[2]Although (B5) does not include polypropylene chloride moiety (b1), (B5) is herein referred to as acryl-modified polypropylene chloride (B5).

A polyolefin base material (X-668, made by Mitsui Toatsu Chemical Industries Kabushiki kaisha) was washed with warm water and then dried naturally. Thereafter, primer composition for polyolefins (1) was sprayed to a surface of the polyolefin base material with a spray gun to form a film of 10 $\mu$m in thickness, and the resultant film was dried at 80° C. for 10 minutes, thus forming a primer coating film on the surface of the base material; wherein the viscosity of primer composition for polyolefins (1) was adjusted to 13 seconds/NO.4 F.C. with solvent naphtha (Solvesso-100) prior to coating. Overcoating paints (R-212 and R-288, made by Nippon Bee Chemical Co., Ltd.) were coated onto the primer coating film in sequence so as to be 20 $\mu$m and 30 $\mu$m, respectively, in thickness, and then dried at 80° C. for 30 minutes to harden the resultant 20 coating films. Properties of primer composition for polyolefins (1) were evaluated in the below-mentioned way. Results thereof are shown in Table 3.

<Evaluation Method>

1. Checkerboard Squares Adhesion Test:

A checkerboard squares cellophane tape peeling test was carried out in accordance with JIS-K5400 as follows: One hundred checkerboard squares of 2 mm×2 mm were prepared, and the cellophane tape peeling test was carried out, when the number of squares as not peeled off was counted.

2. Water Resistance

The coated polyolefin base material was immersed in warm water of 40° C. for 24 hours, and the above mentioned checkerboard squares cellophane tape peeling test was then carried out.

3. Humidity Resistance:

The coated polyolefin base material was left under an atmosphere of 50° C. and humidity 98% for, 240 hours, and the above-mentioned checkerboard squares cellophane tape peeling test was then carried out.

4. Gasohol Resistance:

The coated polyolefin base material (3 cm×3 cm) was immersed into gasohol as obtained by adding ethanol of 10% by volume to regular gasoline, and a time that it took the peeling-off of an end portion of the coating film to reach 3 mm was measured, and a time of 30 minutes or longer was evaluated as "○."

5. Resistance to High Pressure Washing of Cars:

A rift of 4 to 5 cm in length was made on a surface of the coated polyolefin base material with a cutter knife, and the coated polyolefin base material was arranged horizontally and then sprayed with pressurized water of 20° C. and a waiter pressure of 70 kg/cm for 30 seconds. (the spraying direction was at an angle of 30° to the coated face, and the water was sprayed from a distance of 20 cm), when the length of the lift of the coating film from the polyolefin base material was measured (unit: mm). No occurrence of the lift was evaluated as "○."

TABLE 3

|  | Example | | | | |
| --- | --- | --- | --- | --- | --- |
|  | 1 | 2 | 3 | 4 | 5 |
| Acid anhydride modified polypropylene chloride A1 | 12 | 19.6 | 16.8 | 14 | 14.4 |
| Acid anhydride modified polypropylene chloride A2 | — | — | — | — | — |
| Acid anhydride modified polypropylene chloride A3 | — | — | — | — | — |
| Acid anhydride modified polypropylene chloride A4 | — | — | — | — | — |
| Acryl modified polypropylene chloride B1 | 12 | — | 7.2 | — | — |
| Acryl modified polypropylene chloride B2 | — | 14.4 | — | 10 | — |
| Acryl modified polypropylene chloride B3 | — | — | — | — | 9.6 |
| Acryl modified polypropylene chloride B4 | — | — | — | — | — |
| Acryl modified polypropylene chloride B5 | — | — | — | — | — |
| Pigment | 16 | 16 | 16 | 16 | 16 |
| Toluene | 60 | 60 | 60 | 60 | 60 |
| Adhesion | 100 | 100 | 100 | 100 | 100 |
| Water resistance | 100 | 100 | 100 | 100 | 100 |
| Humidity resistance | 100 | 100 | 100 | 100 | 100 |
| Gasohol resistance | ○ | ○ | ○ | ○ | ○ |
| Resistance to high pressure washing of cars | ○ | ○ | ○ | ○ | ○ |

The unit of acid anhydride-modified polypropylene chlorides A1 to A4, acryl-modified polypropylene chlorides B1 to B5, pigment, and toluene is part(s) by weight.

EXAMPLES 2 TO 5 AND COMPARATIVE EXAMPLES 1 TO 6

Primer compositions for polyolefins (2) to (5) and comparative primer compositions for polyolefins (1) to (6) were produced by mixing acid anhydride-modified polypropylene chlorides (A1) to (A4) of properties, a shown in Table 1, and acryl-modified polypropylene chlorides (B1) to (B5), As shown in Table 2, in combinations as shown in Tables 3 and 4.

Properties of the resultant (comparative) primer compositions for polyolefins were evaluated in the same way as of Example 1, and results thereof are shown in Tables 3 and 4.

TABLE 4

|  | Comparative Example | | | | | |
| --- | --- | --- | --- | --- | --- | --- |
|  | 1 | 2 | 3 | 4 | 5 | 6 |
| Acid anhydride-modified polypropylene chloride A1 | — | — | 12 | 12 | — | — |
| Acid anhydride-modified polypropylene chloride A2 | 12 | — | — | — | — | — |
| Acid anhydride-modified polypropylene chloride A3 | — | 12 | — | — | — | 12 |
| Acid anhydride-modified polypropylene chloride A4 | — | — | — | — | 12 | — |
| Acryl-modified polypropylene chloride B1 | 12 | — | — | — | — | — |
| Acryl-modified polypropylene chloride B2 | — | 12 | — | — | — | — |
| Acryl-modified polypropylene chloride B3 | — | — | — | — | 12 | — |
| Acryl-modified polypropylene chloride B4 | — | — | 12 | — | — | 12 |
| Acryl-modified polypropylene chloride B5 | — | — | — | 12 | — | — |
| Pigment | 16 | 16 | 16 | 16 | 16 | 16 |
| Toluene | 60 | 60 | 60 | 60 | 60 | 60 |
| Adhesion | 100 | 100 | 100 | 100 | 100 | 100 |
| Water resistance | 100 | 100 | 100 | 80 | 100 | 100 |
| Humidity resistance | 100 | 100 | 100 | 30 | 100 | 100 |
| Gasohol resistance | 20 minutes | 20 minutes | ○ | ○ | 15 minutes | 20 minutes |
| Resistance to high pressure washing of cars | ○ | ○ | 4 mm | 4 mm | ○ | 4 mm |

The unit of acid anhydride-modified polypropylene chlorides A1 to A4, acryl-modified polypropylene chlorides B1 to B5, pigment, and toluene is part(s) by weight.

<Results of Evaluation>

As to any of Examples 1 to 5, the adhesions the water resistance, the humidity resistance, the gasohol resistance, and the resistance to high pressure washing of cars are all excellent. As to Comparative Example 1, because the chlorine content of acid anhydride-modified polypropylene chloride (A2) is high, the gasohol resistance is inferior. As to Comparative Example 2, because the weight-average molecular weight of acid anhydride-modified polypropylene chloride (A3) is large, the gasohol resistance is inferior. In addition, as to comparative primer composition for polyolefins (2), the storage stability is low. As to Comparative Example 3, because the glass transition temperature of the acrylic polymer chain moiety of acryl-modified polypropylene chloride (B3) isolated, the resistance to high pressure washing of cars is inferior. As to Comparative Example 4, no polypropylene chloride moiety is included and only the acrylic polymer chain moiety is included, and the resistance to high pressure washing of cars is inferior, and the water resistance and the humidity resistance are very inferior. As to Comparative Example 5, because the maleic anhydride content of acid anhydride-modified polypropylene chloride (A4) is low, the gasohol resistance is inferior. As to Comparative Example 6, because the weight-average molecular weight of polypropylene chloride (A3) is large, the gasohol resistance is inferior, and in addition, because the glass transition temperature of the acrylic polymer chain, moiety of acryl-modified polypropylene chloride (B3) is low, the resistance to high pressure washing of cars is inferior.

Furthermore, as to comparative primer composition for polyolefins (6), the storage stability is low.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A primer composition for polyolefins, comprising:

polypropylene chloride (A) comprising acid anhydride grafts through carbon-carbon bonds, which includes polypropylene chloride moiety (a1) and acid anhydride moiety (a2) as bonded thereto, and has a chlorine content of 19.5 to 20.5 wt %, an acid anhydride moiety content of 0.8 to 1.2 wt %, and a weight-average molecular weight of 30,000 to 36,000; and polypropylene chloride (B) comprising acryl grafts through carbon-carbon bonds, which includes polypropylene chloride moiety (b1) and acrylic polymer chain moiety (b2) as grafted thereon, and has a weight-average molecular weight of 30,000 to 200,000, wherein: polypropylene chloride moiety (b1) has a chlorine content of 20 to 30 wt %; acrylic polymer chain moiety (b2) has a glass transition temperature of 60° C. or higher; and the ratio by weight between moieties (b1) and (b2) is b1/b2=5/95 to 50/50;

wherein the ratio by weight between polypropylene chloride (A) and polypropylene chloride (B) is A/B=90/10 to 20/80.

* * * * *